United States Patent
Resso et al.

(10) Patent No.: US 9,145,684 B2
(45) Date of Patent: Sep. 29, 2015

(54) NON-WELDED COPING CAPS AND TRANSITIONS

(71) Applicant: Garland Industries, Inc., Cleveland, OH (US)

(72) Inventors: Frank Resso, Tucker, GA (US); Ron Nelson, Tucker, GA (US)

(73) Assignee: Garland Industries, Inc., Cleveland, OH (US)

( * ) Notice: Subject to any disclaimer, the term of this patent is extended or adjusted under 35 U.S.C. 154(b) by 0 days.

(21) Appl. No.: 14/279,688

(22) Filed: May 16, 2014

(65) Prior Publication Data

US 2014/0245680 A1 Sep. 4, 2014

Related U.S. Application Data

(62) Division of application No. 13/886,353, filed on May 3, 2013, now Pat. No. 8,850,775.

(60) Provisional application No. 61/642,718, filed on May 4, 2012.

(51) Int. Cl.
- *E04H 12/00* (2006.01)
- *E04D 3/40* (2006.01)
- *C09J 5/00* (2006.01)

(52) U.S. Cl.
CPC . *E04D 3/405* (2013.01); *C09J 5/00* (2013.01); *Y10T 156/10* (2015.01); *Y10T 428/19* (2015.01)

(58) Field of Classification Search
CPC .......... E04D 3/405; E04D 5/145; E04D 5/148
USPC ............ 52/60, 741.1, 741.4, 745.05, 745.06, 52/300; 156/93, 304.2, 304.3; 428/61
See application file for complete search history.

(56) References Cited

U.S. PATENT DOCUMENTS

| | | | | |
|---|---|---|---|---|
| 5,084,119 | A * | 1/1992 | Barksdale | 156/157 |
| 5,595,804 | A * | 1/1997 | Korbel | 428/57 |
| 5,698,056 | A | 12/1997 | Kamiyama et al. | |
| 5,964,252 | A * | 10/1999 | Simmons et al. | 138/149 |
| 6,073,400 | A * | 6/2000 | Balisle et al. | 52/58 |
| 6,562,426 | B1 | 5/2003 | Kamiyama et al. | |
| 6,623,578 | B2 * | 9/2003 | Wasitis et al. | 156/71 |
| 6,783,830 | B2 | 8/2004 | Cohen et al. | |
| 6,841,615 | B2 * | 1/2005 | Andersson et al. | 524/612 |
| 6,935,379 | B1 | 8/2005 | Buchanan | |
| 7,159,620 | B2 | 1/2007 | Kissell | |
| 2002/0172792 | A1 * | 11/2002 | Jarvis et al. | 428/57 |
| 2003/0010439 | A1 | 1/2003 | Fenton | |
| 2004/0009324 | A1 | 1/2004 | Wu | |
| 2004/0224114 | A1 * | 11/2004 | Patel | 428/40.1 |
| 2005/0114989 | A1 | 6/2005 | Harward | |

(Continued)

FOREIGN PATENT DOCUMENTS

GB 1450961 9/1976

*Primary Examiner* — Beth Stephan
(74) *Attorney, Agent, or Firm* — Fay Sharpe LLP

(57) ABSTRACT

A design and fabrication technique whereby a coping cap and/or transition can be supplied with mitered corner sections and other transitional components which utilize the identical prefinished or bare sheet metal material(s) without any reliance on exposed mechanical fasteners, welding, soldering, or post-applied paints. This is essentially accomplished by joining the pre-finished sheet material(s) together using a mesh screen and adhesive on the underside (non-exposed) face of the sheet material(s).

26 Claims, 12 Drawing Sheets

(56) References Cited

U.S. PATENT DOCUMENTS

| | | | |
|---|---|---|---|
| 2007/0000002 A1* | 1/2007 | Shiue | A41D 27/245 2/2.15 |
| 2007/0122593 A1* | 5/2007 | Conboy | 428/167 |
| 2007/0151180 A1* | 7/2007 | Pace et al. | 52/287.1 |
| 2009/0090068 A1* | 4/2009 | O'rourke | 52/58 |
| 2009/0280284 A1 | 11/2009 | Pellegrino | |
| 2010/0050553 A1 | 3/2010 | Schofield | |
| 2010/0058691 A1 | 3/2010 | Mannion | |
| 2010/0148537 A1 | 6/2010 | Stanton | |
| 2010/0199584 A1 | 8/2010 | Kalkanoglu | |
| 2011/0097610 A1 | 4/2011 | Rau et al. | |
| 2012/0128914 A1 | 5/2012 | Crum | |
| 2012/0276320 A1* | 11/2012 | Zalewski et al. | 428/61 |
| 2012/0278965 A1 | 11/2012 | Schiue | |

* cited by examiner

NON-WELDED COPING CAPS AND TRANSITIONS

The present invention is a divisional application of U.S. patent application Ser. No. 13/886,353 filed May 3, 2013, which in turn claims priority on U.S. Provisional Patent Application Ser. No. 61/642,718 filed May 4, 2012, which is incorporated herein.

The present invention is directed to the building industry, particularly to coping systems for buildings, and more particularly to a coping system that includes mitered corner sections and other transitional components without any reliance on exposed mechanical fasteners, welding, soldering, or post-applied paints.

BACKGROUND OF THE INVENTION

Many, if not a majority, of commercial buildings are constructed with flat roofs with raised parapet walls around the building perimeter and at other locations within the footprint of the roof. Traditionally, the top of the parapet wall has been terminated and sealed with a cut stone, masonry, or precast concrete coping cap set in mortar and/or sealant. Some purposes of the coping cap are to aesthetically accent the top of the wall, and to seal the wall cavity from moisture infiltration and "wind washing". The coping cap stone is generally slightly wider than the wall so as to create a small (1"-3") overhang on each face of the wall for additional weather protection.

Traditional coping caps remain desirable for their aesthetic appeal, but due to their high cost and relatively poor performance with respect to weather tightness, stone, masonry, and pre-cast concrete coping caps have been largely replaced by continuous lengths (3 feet to 20 feet long, with 10 feet being most common) of sheet metal coping caps. The sheet metal coping caps are basically "C" shaped profiles of unpainted or prefinished sheet metal. The metal coping cap is sized to slip over the wall section with each flange of the "C" oriented vertically and secured to the inside and/or outside face of the wall. At one or both longitudinal edges, an angled "drip lip" may be formed into the metal coping cap. Some metal coping systems rely on exposed fasteners for securement to the wall; some on concealed cleats that the coping is then crimped onto; and others on discontinuous sheet metal "anchor chairs" that provide a springing mechanism which results in no exposed fasteners.

Metal coping systems are most often formed from aluminum or steel sheet metal. However, some coping systems are also formed from sheet copper, stainless steel, or zinc material. Very often, aluminum and steel coping systems are painted, and most often, these painted metal coping systems are made from prepainted flat sheet metal stock which has been processed by the "continuous coil coating" method in which very long (2,000 to 20,000 feet long) coils of sheet metal are painted with multiple chemical dipping treatments and coats of specialized roller applied paints preferred by the building products industry. In this way, metal coping systems are widely and economically available in many colors with high performance paint systems that are warrantied for up to 30 years of service.

The Difficulty with Prefinished Metal Coping Systems

While prefinished metal coping systems offer significant performance, longevity, and aesthetic appeal at a moderate price, the systems currently lack an equally exceptional method of providing coping system continuity wherein two or more walls join, such as at a building corner. At any transition, for instance an outside corner of the building, a metal coping system is required to be formed in an acute "L" shape in plane view, while maintaining a "C" shaped cross sectional profile. In all methods of accomplishing this, a section of continuous metal coping can be cut and arranged in such a way as to result in a sheet metal joint at an angle with respect to each of the walls (for a 90° building corner, this seam would be oriented at a 45° angle, from the corner of the outside face of the wall corner to the inside face of the wall corner). At this sheet metal joint, one side of the coping cap is secured to the other side of the coping cap to form a single secured and sealed unit to cap the wall at each wall transition. Currently, there are a number of methods of joining the sheet metal together at the miter joint, each with an aspect rendering the miter unit inferior to the continuous lengths of metal coping away from the wall corner or transition.

First, the miter joint can be secured with mechanical fasteners (rivets, screws, or bolts) and sealed with caulk. This method can be accomplished with both bare and prefinished metals of all types, but results in a coping cap with visible, obtrusive fastener penetrations and possible sealant migration. Furthermore, for prefinished metals, the paint used for the fasteners will fade at a different rate than the coil-coated prefinished sheet metal, thus rendering the fasteners, over time, lighter or darker than the adjacent sheet metal.

Second, some metals, such as aluminum and stainless steel, can be welded; others, such as copper and zinc, can be soldered. Although costly and requiring skilled craftsmen, the metal joint can be secured and sealed by fusing the metal together at the joint by one of these methods. Galvanized or Galvalume® steel cannot be fused by these methods without dramatically increasing the risk of rust corrosion at the joint. In the case of bare metals fused together, the sheet metal joint will be discolored, whether by dark marks from the heat of welding, from the flux solution applied to the metal surface before fusing, or by silver colored solder filler metal on natural copper or zinc sheet. In the case of bare metals, this aesthetic anomaly is endured, as no better a solution currently exists. In the case of prefinished metals that are fused together, the paint coatings must be removed prior to fusing the materials together. After being fused together, either the joint area or the entire miter section must be repainted.

With current technology, even using a paint system with the same resin and pigment types as used by the continuous coil coating process, the post-fusing painting of these mitered components will result in a finish that may be slightly different than the adjacent prefinished metal coping sections, and will certainly fade at a different rate over time. So, even welded and fully post-painted miter and transition sections will appear different in coloration over a short period of time when compared to adjacent straight lengths of prefinished metal coping caps.

It is currently possible to fuse all miter and transitional sections together and post-paint all coping caps and transitions, as well as all straight lengths of coping cap to insure that the entire coping system weathers, fades, and discolors at the same uniform rate. While this eliminates several objections of the above mentioned methods, this is a generally cost prohibitive and time consuming process. Furthermore, the post-applied paint systems use on average 500% more paint material, with more VOC release, and an overall lower level of performance when compared to the continuous coil coating method used for prefinished sheet metal.

In view of the current state of the prior art, there remains a need for a coping cap that overcomes the deficiencies of prior art coping caps.

SUMMARY OF THE INVENTION

The present invention is directed to an improved coping cap and/or transition and a method of manufacturing the coping cap and/or transition that overcomes the problems associated with prior art coping caps and/or transitions. The improved coping cap and/or transition does not require a weld or solder, thus the adverse problems associated with coping caps and/or transitions that include a weld or solder are overcome. The improved coping cap and/or transition provides adequate strength and durability of the sheet joint for a coping cap. The improved coping cap and/or transition does not exhibit the undesirable discoloration that occurs with welding, soldering or other metal fusing methods for a coping cap. The improved coping cap and/or transition allows for the use of prepainted sheet metal produced by the continuous coil coating method which is more economical, durable, efficient, and better performing than other means of painting. The improved coping cap and/or transition does not required post-applied touch-up paints or other cosmetic corrections that will discolor over time at a different rate than the adjacent prepainted sheet materials. The improved coping cap and/or transition does not require costly equipment to post-apply and cure paint, thus the time required to cure post-applied paint is eliminated. The improved coping cap and/or transition does not require exposed mechanical fasteners to be used to secure sheet joints to one another.

In one non-limiting aspect of the present invention, there is provided a method for forming the coping cap and/or transition in accordance with the present invention. The method includes the steps of:

a) 1) forming two or more pieces of material and arranging the pieces of material to be in contact with one another to match the plan-view (overhead, looking down) profile of a wall transition, or 2) providing a single piece of material that is cut/notched/formed into a flat pattern that can then be folded/formed in such a way as to create a profile of a wall transition with one or more butt joint(s) aligned and in contact with one another;

b) applying an adhesive to the underside (unexposed) surface of the one or more pieces of material(s) in the vicinity of the aligned and in-contact, but not (yet) secured sheet joints or butt joint(s);

c) providing one or more pieces and/or layers of a reinforcing material that is set onto or into the adhesive on the underside (unexposed) surface of the wall transition; and, d) allowing the adhesive to cure, resulting in a manufactured coping cap/transition.

The manufactured coping cap/transition does not include a welded or soldered connection and the adhesively connected reinforcing material is located on the side of the coping cap/transition that cannot be seen when the coping cap/transition is secured to a building. As such, the exterior surface of the coping cap/transition is absent a weld or solder, thus discoloring problems are avoided. The sheets of coping can be formed of metal; however, other or additional material such as plastic, composite materials, fiber reinforced materials, etc. can be used.

In another and/or alternative non-limiting aspect of the present invention, the coping cap can be any designed configuration. For example, the wall transition for the coping cap can be a 90° corner (inside or outside corner), acute or obtuse angle other than 90°, tee transition (where one wall intersects another, as in a 3-way intersection), 4-way or more intersection, change in wall width (wider to narrower, or narrower to wider), end of a wall (requiring an "end cap" at the termination of the wall to enclose the narrow edge of the wall), wall jamb (wherein the parapet wall terminates into a higher exterior building wall), or any other transitional shape encountered on a coping for a building. As can be appreciated, the coping cap can have other configurations.

In still another and/or alternative non-limiting aspect of the present invention, the coping cap profiles can be formed from a material (e.g., sheet metal, etc.) by means of bending, braking, roll forming, stamping, or other cold forming methods; and/or the coping cap profile can be formed by extruding, pultruding, hot rolling, casting, or other hot forming methods. When the material is not metal, the coping cap profiles can be formed by casting, molding, extruding, etc. The coping cap profiles can be arranged adjacent to and in contact with one another by saw cutting, shearing, snipping, nibbling, or other means of cutting continuous profiled sections into sections with either angle-cut ends or notch-outs. The material used for the coping cap can be prepainted metal (e.g., base metal, etc.), metal coated or clad with metal (as in hot-dipped galvanized or Galvalume® steel, etc.), or be a painted material or otherwise coated material. The coping cap profiles can be formed by one or more pieces of material. When the coping cap profiles are formed of two or more pieces, the pieces of material are generally the same material; however, this is not required. When the coping profile is formed of a single piece of material, the single piece of material can be cut/notched/formed into a flat pattern that can then be folded/formed in such a way as to create a transitional coping cap profiled section with one or more butt joints aligned and in contact with one another, but not (yet) secured to one another. A jig or other type of device can be optionally used to fold the material.

In yet another and/or alternative non-limiting aspect of the present invention, an adhesive is applied to the underside or interior (unexposed) surface of the one or more pieces of material in the vicinity of the aligned and in-contact, but not (yet) secured joints. The adhesive can be liquid or solid, based upon any number of composition chemistries. In one non-limiting configuration, the adhesive is an epoxy adhesive and/or a urethane adhesive (e.g., J-B Weld®, 3M™ adhesives, Liquid Nails®, etc.). The adhesive can be applied by roller, brush, spray, caulk-type tube, aerosol, hand or mechanical pressure, or by any other means. One or more layers of adhesive can be used. The thickness of the adhesive layer is non-limiting. One or more types of adhesive can be used. The adhesive can optionally possess waterproofing properties, and/or a secondary waterproofing material may also, optionally, be incorporated into the unexposed or interior face of the material joint and/or applied to the material joint.

In still yet another and/or alternative non-limiting aspect of the present invention, one or more pieces and/or layers of a reinforcing material is set onto and/or into the adhesive on the underside or interior (unexposed) surface of the coping transition. The reinforcing material can be a strip of mesh or solid material. The reinforcing material can be any suitable metallic or non-metallic strip, completely or sporadically "backing up" the sheet joint. In one non-limiting configuration, the reinforcing material is a mesh material that is applied onto and/or into the adhesive layer. The size, composition, shape and/or thickness of the reinforcing material is non-limiting. The reinforcing material can be a metal material, a fabric material, a fiber layer, a composite material layer, a plastic material, etc. In one non-limiting configuration, the reinforcing material is in the form of one or more perforated sheet metal strips made of stainless steel, aluminum, copper, tin, or galvanized steel. In another non-limiting configuration, the reinforcing material is in the form of one or more strips of glass fiber, aramid fiber (Kevlar®), and/or carbon fiber. After the one or more pieces and/or layers of reinforcing material are applied onto and/or into the adhesive layer, the adhesive is allowed to substantially or fully cure, thus resulting in a manufactured coping cap/transition. The non-welded or solder abutting surfaces on the exterior surface of the coping cap/transition are not further treated, thus discoloration issues regarding the exterior surface of the coping cap/transition are eliminated. Although the non-welded or solder abutting surfaces on the exterior surface of the coping cap/transition are not further treated, water, dirt, etc. cannot fully penetrate into the interior of the coping cap/transition due to the one or more layers of adhesive and/or the one or more pieces and/or layers of reinforcing materials forming a water, dirt and/or air barrier layer.

In another and/or alternative non-limiting aspect of the present invention, a protective layer in the form of a coating material and/or one or more strips of cover material can be optionally inserted over the adhesive and/or the one or more pieces and/or layers of reinforcing material prior to or after the adhesive has fully cured. The size, composition, shape and/or thickness of the protective layer is non-limiting. The protective layer can be a metal material, a fabric material, a fiber layer, a composite material layer, a plastic material, a polymer coating, a painted layer, etc. In one non-limiting configuration, the protective layer is in the form of a piece of tape (e.g., butyl tape, aluminum tape, etc.) that is positioned over adhesive and one or more pieces and/or layers of a reinforcing material. The protective layer, when used, can a) provide additional structural strength to the coping cap/transition, b) provide additional waterproofing or sealing to the coping cap/transition, and/or c) result in improved aesthetics to the coping cap/transition.

In still another and/or alternative non-limiting aspect of the present invention, the formed coping cap/transition can be further treated; however, this is not required. In one non-limiting embodiment, the interior and/or exterior surface of the formed coping cap/transition can be painted, coated with a sealant or other type of coating, etc.

In one non-limiting object of the present invention, there is provided an improved coping cap and/or transition and a method of manufacturing the coping cap and/or transition that overcomes the problems associated with prior art coping caps and/or transitions.

In another and/or alternative non-limiting object of the present invention, there is provided an improved coping cap and/or transition that is formed by a design and fabrication technique whereby the coping cap and/or transition can be supplied with mitered corner sections and other transitional components which utilize the identical prefinished or bare sheet metal materials without any reliance on exposed mechanical fasteners, welding, soldering, or post-applied paints.

In still another and/or alternative non-limiting object of the present invention, there is provided an improved coping cap and/or transition that is formed by joining the prefinished material(s) together using a mesh screen and adhesive on the underside face of the sheet material(s).

In another and/or alternative non-limiting object of the present invention, there is provided an improved coping cap and/or transition that does not require a weld or solder.

In still another and/or alternative non-limiting object of the present invention, there is provided an improved method of forming a coping cap and/or transition that includes the steps of a) forming two or more pieces of material and arranging the pieces of material to be in contact with one another to match the plan-view profile of a wall transition, b) applying an adhesive to the underside (unexposed) surface of the one or more pieces of material(s) in the vicinity of the aligned and in-contact, but not (yet) secured sheet joints or butt joint(s), c) providing one or more pieces and/or layers of a reinforcing material that is set onto or into the adhesive on the underside (unexposed) surface of the wall transition, and, d) allowing the adhesive to cure, resulting in a manufactured coping cap/transition.

In yet another and/or alternative non-limiting object of the present invention, there is provided an improved method of forming a coping cap and/or transition that includes the steps of a) providing a single piece of material that is cut/notched/formed into a flat pattern that can then be folded/formed in such a way as to create a profile of a wall transition with one or more butt joint(s) aligned and in contact with one another, b) applying an adhesive to the underside (unexposed) surface of the one or more pieces of material(s) in the vicinity of the aligned and incontact, but not (yet) secured sheet joints or butt joint(s), c) providing one or more pieces and/or layers of a reinforcing material that is set onto or into the adhesive on the underside (unexposed) surface of the wall transition, and, d) allowing the adhesive to cure resulting in a manufactured coping cap/transition.

In still yet another and/or alternative non-limiting object of the present invention, there is provided an improved coping cap and/or transition wherein the adhesively connected reinforcing material is located on the side of the coping cap/transition so that it cannot be seen when the coping cap/transition is secured to a building.

In another and/or alternative non-limiting object of the present invention, there is provided an improved coping cap and/or transition that can be a 90° corner (inside or outside corner), acute or obtuse angle other than 90°, tee transition (where one wall intersects another, as in a 3-way intersection), 4-way or more intersection, change in wall width (wider to narrower, or narrower to wider), end of a wall (requiring an "end cap" at the termination of the wall to enclose the narrow edge of the wall), wall jamb (wherein the parapet wall terminates into a higher exterior building wall), or any other transitional shape encountered on a coping for a building.

In still another and/or alternative non-limiting object of the present invention, there is provided an improved coping cap and/or transition that can be formed by means of bending, braking, roll forming, stamping, other cold forming methods, extruding, pultruding, hot rolling, casting, other hot forming methods, casting, molding, extruding, etc.

In yet another and/or alternative non-limiting object of the present invention, there is provided an improved coping cap and/or transition that includes an adhesive that is applied to the underside or interior surface of the one or more pieces of material in the vicinity of the aligned and in-contact, but not yet secured joints.

In still yet another and/or alternative non-limiting object of the present invention, there is provided an improved coping cap and/or transition that includes one or more pieces and/or layers of a reinforcing material that are set onto and/or into the adhesive on the underside or interior surface of the coping transition.

In still yet another and/or alternative non-limiting object of the present invention, there is provided an improved coping cap and/or transition having non-welded or solder abutting surfaces on the exterior surface of the coping cap/transition that are not further treated and water, dirt, etc. cannot fully penetrate into the interior of the coping cap/transition due to the one or more layers of adhesive and/or the one or more pieces and/or layers of reinforcing materials that form a water, dirt and/or air barrier layer.

In another and/or alternative non-limiting object of the present invention, there is provided an improved coping cap and/or transition that includes a protective layer inserted over the adhesive and/or the one or more pieces and/or layers of reinforcing material prior to or after the adhesive has fully cured.

In still another and/or alternative non-limiting object of the present invention, there is provided an improved coping cap and/or transition that includes a secondary waterproofing material that can be applied prior to and/or after the adhesive layer is applied to the interior of the coping cap, which secondary waterproofing material can be liquid (e.g., liquid polymer sealant, etc.) or non-liquid coating (e.g., waterproof adhesive tape, etc), and wherein the material and/or thickness of the secondary waterproofing material is non-limiting.

These and other objects and advantages will become apparent to those skilled in the art upon reading and following the description taken together with the accompanying drawings.

BRIEF DESCRIPTION OF THE DRAWINGS

Reference may now be made to the drawings which illustrate various non-limiting embodiments that the invention may take in physical form and in certain parts and arrangement of parts wherein.

DETAILED DESCRIPTION OF THE NON-LIMITING EMBODIMENTS

Figure 1:
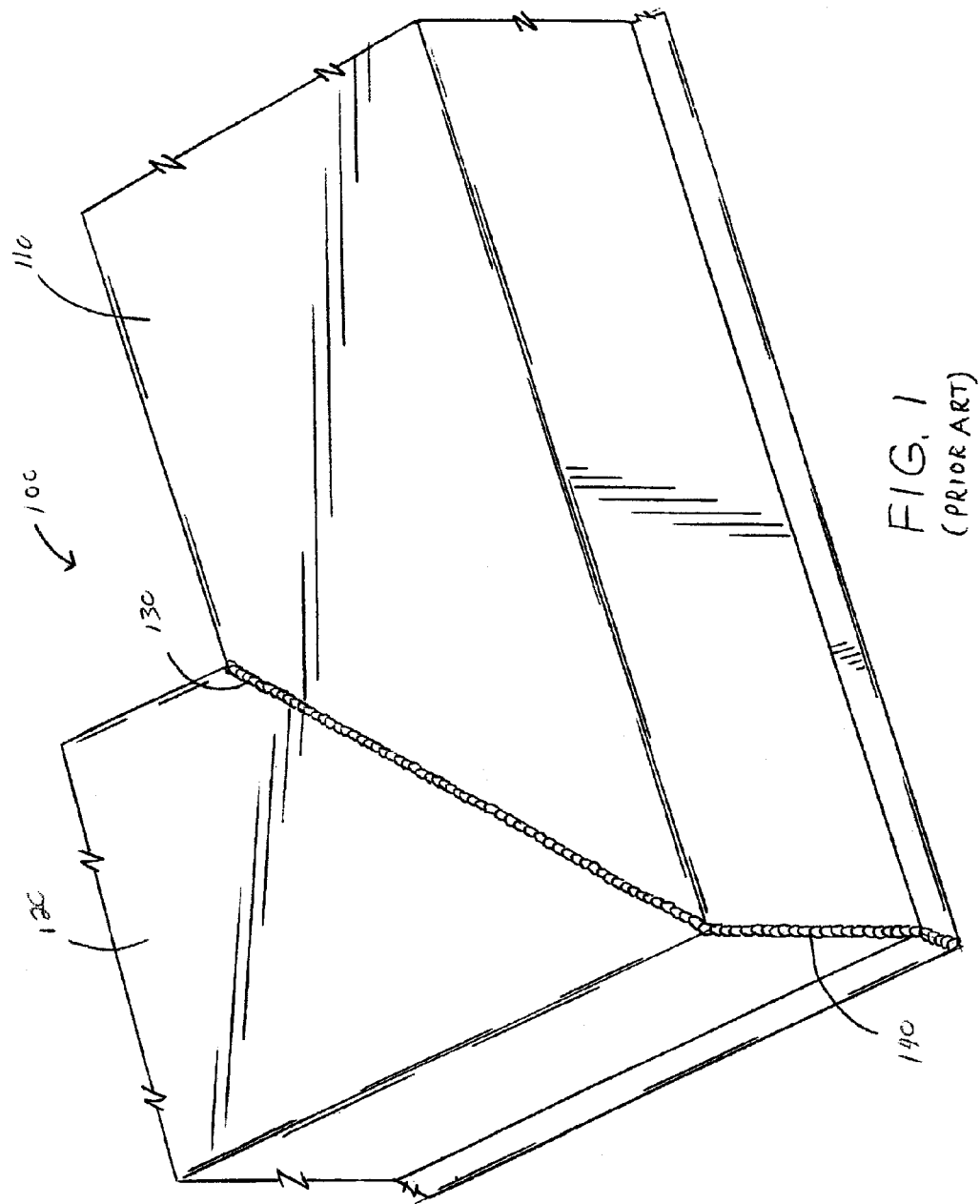
FIG. 1 illustrates a prior art coping cap that includes a welded seam on the exterior surface of the coping cap.

Referring now to the drawings, wherein the showings are for the purpose of illustrating preferred embodiments of the invention only and not for the purpose of limiting same, FIGS. 2-12 illustrate non-limiting configurations of a novel coping cap and a method for forming the novel coping cap in accordance with the present invention. The improved coping cap and/or transition does not require a weld or solder, thus the adverse problems associated with coping caps and/or transitions that include a weld or sold are overcome. As illustrated in FIG. 1, a prior art coping cap 100 is shown having a welded or solder seam 130, 140 on the exterior surface of the coping cap. The coping cap is formed of two pieces of material 110, 120 that are connected together by the selected or solder seam. The welded or solder seam 130 is used to weld together the exterior bottom portion of the coping cap and the welded or solder seam 140 is used to weld together the exterior front edge of the coping cap. Over time, the welded or solder seam can result in undesirable discoloration, thus detract from the aesthetics of the coping cap.

The improved coping cap and/or transition 200 in accordance with the present invention eliminates the use of welded or solder seam on the exterior surface 204 of the coping cap and/or transition 200 and still provides adequate strength and durability of the sheet joint or seam of the coping cap and/or transition. The improved coping cap and/or transition does not exhibit the undesirable discoloration that occurs with welding, soldering or other metal fusing methods for a coping cap. The improved coping cap and/or transition allows for the use of prepainted sheet metal produced by the continuous coil coating method, which is more economical, durable, efficient, and better performing than other means of painting. The improved coping cap and/or transition does not required post-applied touch-up paints or other cosmetic corrections that will discolor over time at a different rate than the adjacent prepainted sheet materials. The improved coping cap and/or transition does not require costly equipment to post-apply and cure paint, thus the time required to cure post-applied paint is eliminated. The improved coping cap and/or transition does not require exposed mechanical fasteners to be used to secure sheet joints to one another.

Figure 2:
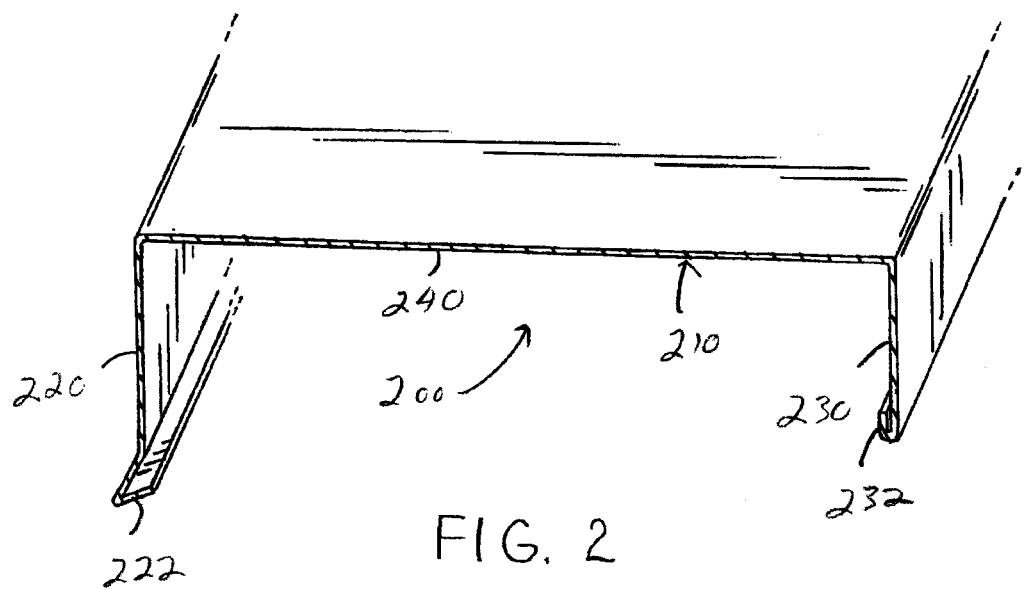
FIG. 2 is an end view of one piece of a two-piece coping cap in accordance with the present invention.
Figure 3:
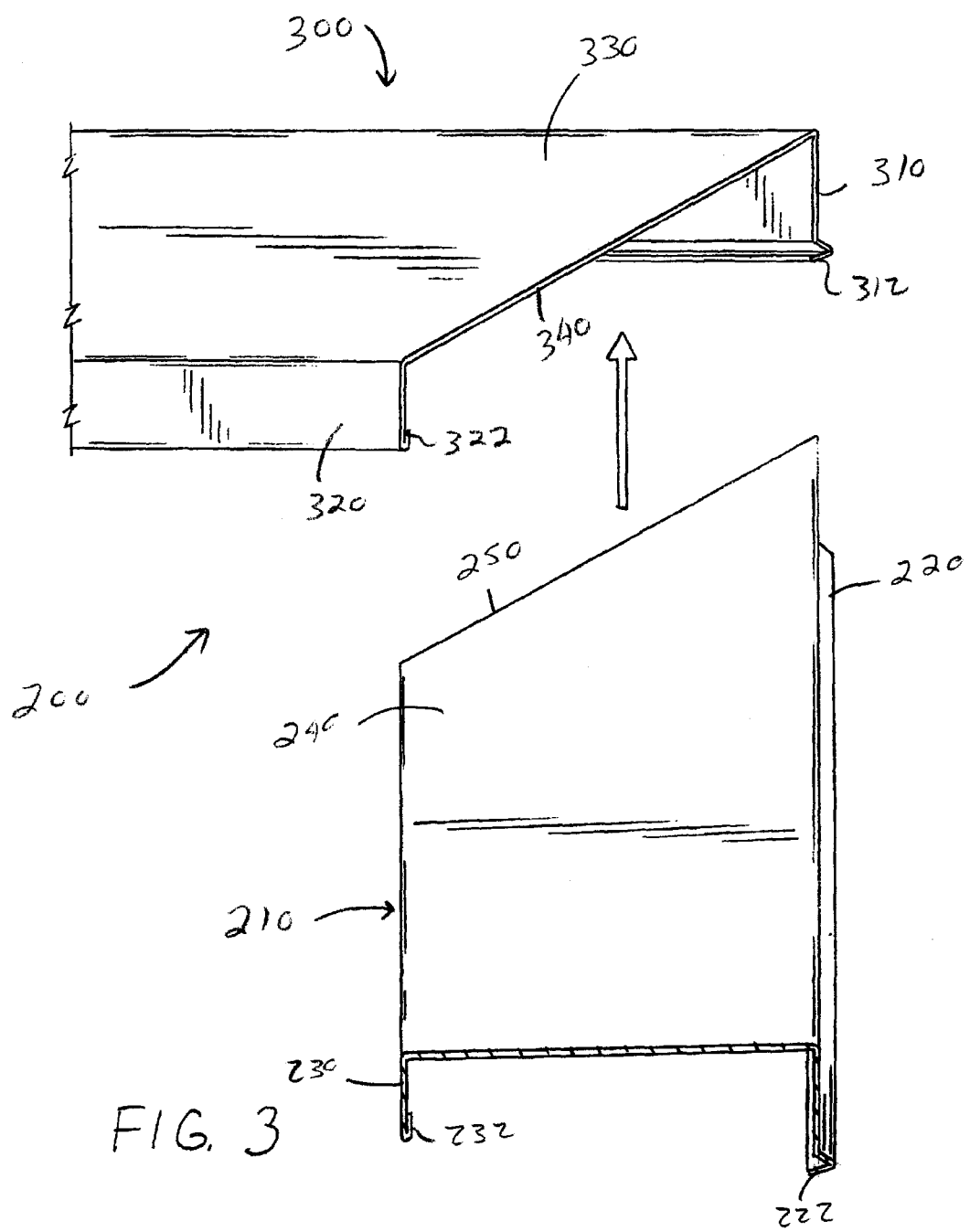
FIG. 3 is a perspective view of the interior surface of two unattached pieces of a two-piece coping cap in accordance with the present invention.

Referring now to FIGS. 2-7, there is illustrated a non-limiting coping cap 200 that is formed of two pieces of material. FIG. 2 illustrates the end profile of a first piece 210 of the coping cap 200. The end profile illustrates that the coping cap includes a front flange 220, a rear flange 230 and a base section 240. The front flange can include a folded edge 222; however, this is not required. The rear edge can included a folded edge 232; however, this is not required. The end profile of the coping cap is non-limiting. The coping cap can be absent the front or rear flange. The length, thickness and shape of the front and rear flange and base section are non-limiting. The orientation of the front and rear flange to the base section are non-limiting. The material used for the coping cap can be prepainted metal, metal coated or clad with metal (as in hot-dipped galvanized or Galvalume® steel, etc.), or be a painted material or otherwise coated material. The type of metal used to form the coping cap can include stainless steel, aluminum, copper, tin, galvanized steel, etc. As can be appreciated, the material used to form the coping cap can be a material other than metal (e.g., composite material, ceramic, etc.).

The coping cap can be any designed configuration. For example, the wall transition for the coping cap can be a 90° corner (inside or outside corner), acute or obtuse angle other than 90°, tee transition (where one wall intersects another, as in a 3-way intersection), 4-way or more intersection, change in wall width (wider to narrower, or narrower to wider), end of a wall (requiring an "end cap" at the termination of the wall to enclose the narrow edge of the wall), wall jamb (wherein the parapet wall terminates into a higher exterior building wall), or any other transitional shape encountered on a coping for a building.

The coping cap profiles can be formed from a material (e.g., sheet metal, etc.) by means of bending, braking, roll forming, stamping, or other cold forming methods; and/or the coping cap profile can be formed by extruding, pultruding, hot rolling, casting, or other hot forming methods. When the material is not metal, the coping cap profiles can be formed by casting, molding, extruding, etc. The coping cap profiles can be arranged adjacent to and in contact with one another by saw cutting, shearing, snipping, nibbling, or other means of cutting continuous profiled sections into sections with either angle-cut ends or notch-outs.

Referring now to FIGS. 3-7, the coping cap 200 is formed of a first piece 210 and a second piece 300. The second piece 300 includes a front flange 310, a rear flange 320 and a base section 330. The front flange can include a folded edge 312; however, this is not required. The rear edge can included a folded edge 322; however, this is not required. The cross-sectional profiles of the first and second pieces can be the same; however, this is not required. The material used to form the first and second pieces can be the same; however, this is not required. The first edge 250 of first piece 210 is cut so as to abut against a first edge 340 of second piece 300. As illustrated by the arrow in FIG. 2, the first and second pieces are positioned together such that the first edge on the first and second pieces abut against one another to form a seam 350 between the first and second edges.

Figure 4:
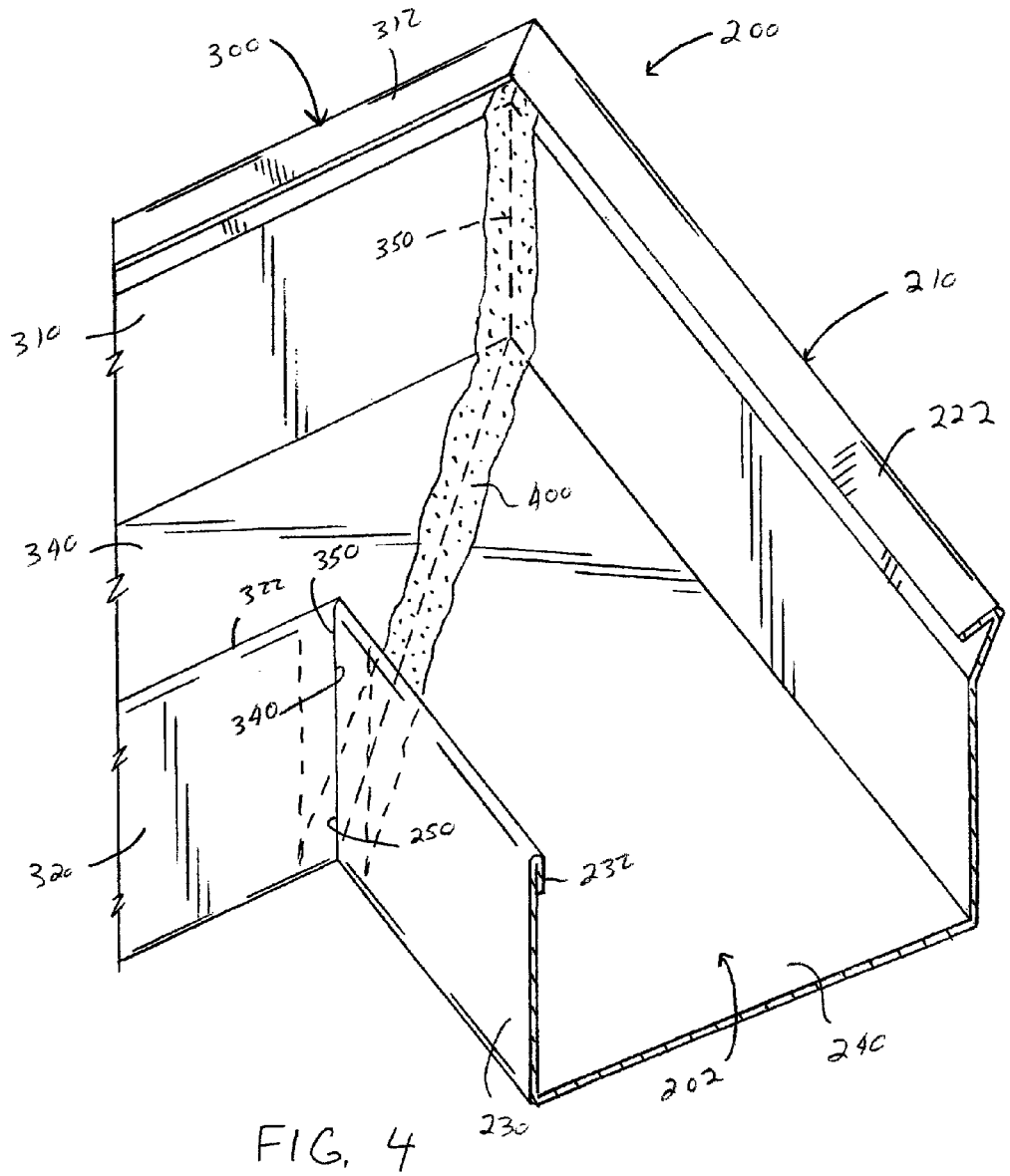
FIG. 4 is a perspective view of the interior surface of the two pieces of the coping cap positioned together and an adhesive layer applied to an interior surface of the two pieces.

Referring now to FIG. 4, the first and second pieces are illustrated as positioned together to form a seam 350 between the first and second edges. An adhesive layer 400 is also illustrated as being applied to the interior surface 202 of the coping cap. The adhesive layer is illustrated as being applied over and along the full length of the seam; however, this is not required. As can be appreciated, the adhesive layer can be positioned only on each side the seam so as to not overlap the seam; however, this is not required. Generally, at least about 30% of the length of the seam on the interior surface 202 is overlapped or covered by the adhesive, typically a majority of the length of the seam on the interior surface 202 is overlapped or covered by the adhesive and, more typically, at least about 75% of the length of the seam on the interior surface 202 is overlapped or covered by the adhesive. The adhesive layer can be applied continuously along the length of the seam or applied in discontinuous sections along the length of the seam. The adhesive layer can be formed of one or more layers of adhesive. The thickness of the adhesive layer is non-limiting. The width of the adhesive layer is non-limiting. As will be discussed in more detail below, the width of the adhesive layer is generally at least about 50% of the width of the reinforcing material 500, typically at least about 75% of the width of the reinforcing material 500, still more typically at least 100% of the width of the reinforcing material 500 and, yet more typically, is greater than 100% of the width of the reinforcing material 500. The adhesive used to form the adhesive layer can be liquid or solid, based upon any number of composition chemistries. For example, the adhesive can be an epoxy adhesive and/or a urethane adhesive. The adhesive can be applied to the interior surface of the coping cap by a roller, a brush, a spray system, a caulk-type tube, an aerosol spray, hand or mechanical pressure, or by any other means. One or more types of adhesive can be used to form the adhesive layer. The adhesive can optionally possess waterproofing properties; however, this is not required. Although not shown, a secondary waterproofing material can be optionally applied prior to and/or after the adhesive layer is applied to the interior of the coping cap. This secondary waterproofing material can be a liquid (e.g., liquid polymer sealant, etc.) or a non-liquid coating (e.g., waterproof adhesive tape, etc). The material and/or thickness of the secondary waterproofing material is non-limiting. Generally, the secondary waterproofing material, when used is applied prior to the application of the adhesive layer or embedded in the adhesive layer; however, this is not required.

Figure 5:
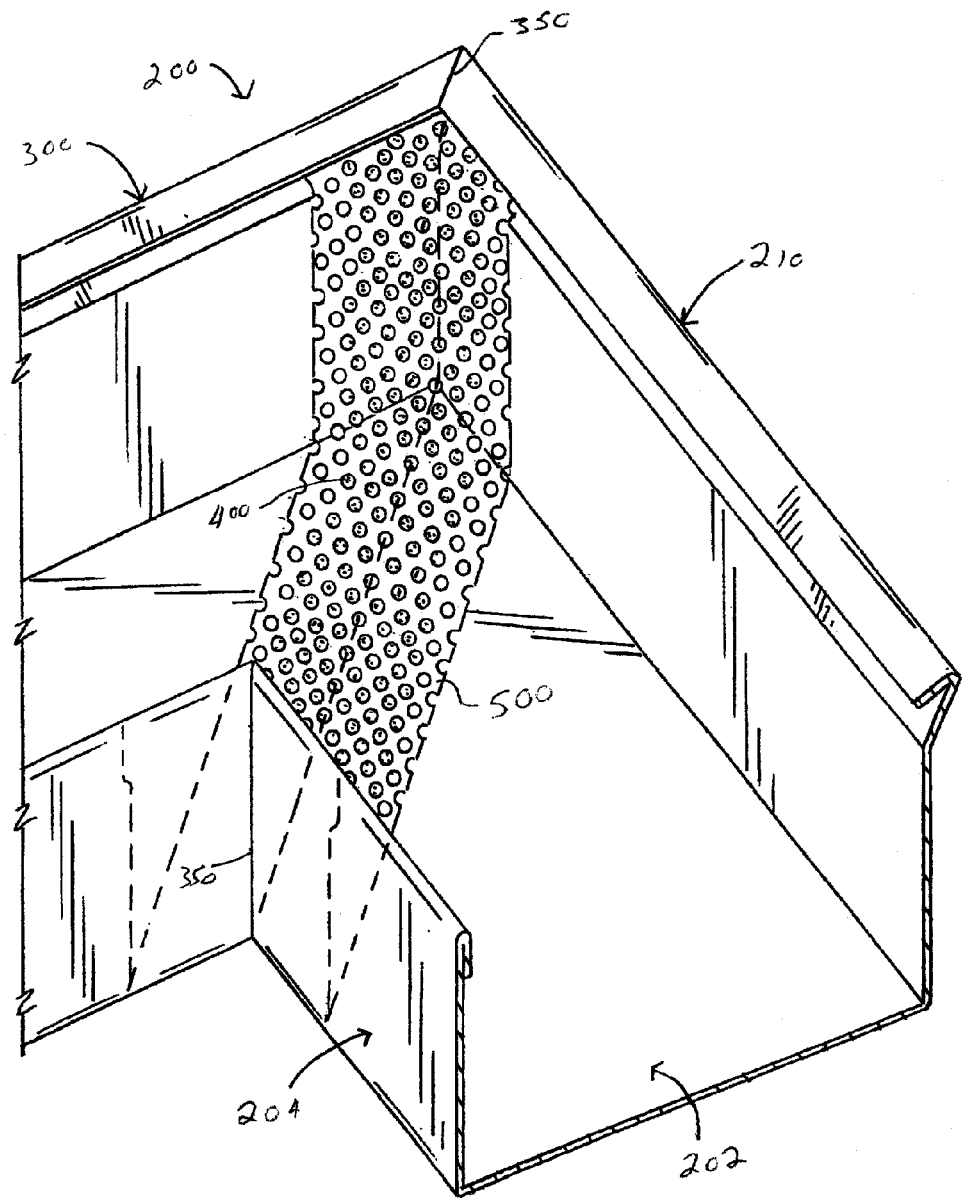
FIG. 5 is a perspective view of the interior surface of the two pieces of the coping cap of FIG. 4 wherein a reinforcing material is applied to the adhesive layer.

Referring now to FIG. 5, a reinforcing material 500 is applied over a portion or all of the adhesive layer. The reinforcing material is illustrated as being applied over and along the full length of the seam and covers all of the adhesive layer; however, this is not required. The reinforcing material is illustrated as overlapping the seam. The reinforcing material can be applied continuously along the length of the seam and adhesive layer or applied in discontinuous sections along the length of the seam and adhesive layer. Generally, at least about 30% of the length of the seam is overlapped or covered by the reinforcing material, typically a majority of the length of the seam is overlapped or covered by the reinforcing material, more typically at least about 75% of the length of the seam is overlapped or covered by the reinforcing material and, still more typically, at least about 90% of the length of the seam is overlapped or covered by the reinforcing material. The reinforcing material can be formed of one or more layers of material. The reinforcing material can be set onto and/or into the adhesive. The reinforcing material can be a strip of mesh or solid material. The reinforcing material can be any suitable metallic or non-metallic strip. As illustrated in FIG. 5, the reinforcing material is a mesh material that is applied onto the adhesive layer. The size, composition, shape and/or thickness of the reinforcing material is non-limiting. The reinforcing material can be a metal material, a fabric material, a fiber layer, a composite material layer, a plastic material, etc. As illustrated in FIG. 5, the reinforcing material is in the form of a perforated sheet metal strip (e.g., stainless steel, aluminum, copper, tin, galvanized steel, etc.). The reinforcing material is generally applied to the adhesive layer prior to the adhesive layer fully curing so that a bond is formed between the adhesive layer and the reinforcing material. After the reinforcing material is applied onto and/or into the adhesive layer, the adhesive is allowed to substantially or fully cure, thus resulting in a manufactured coping cap/transition.

Figure 7:
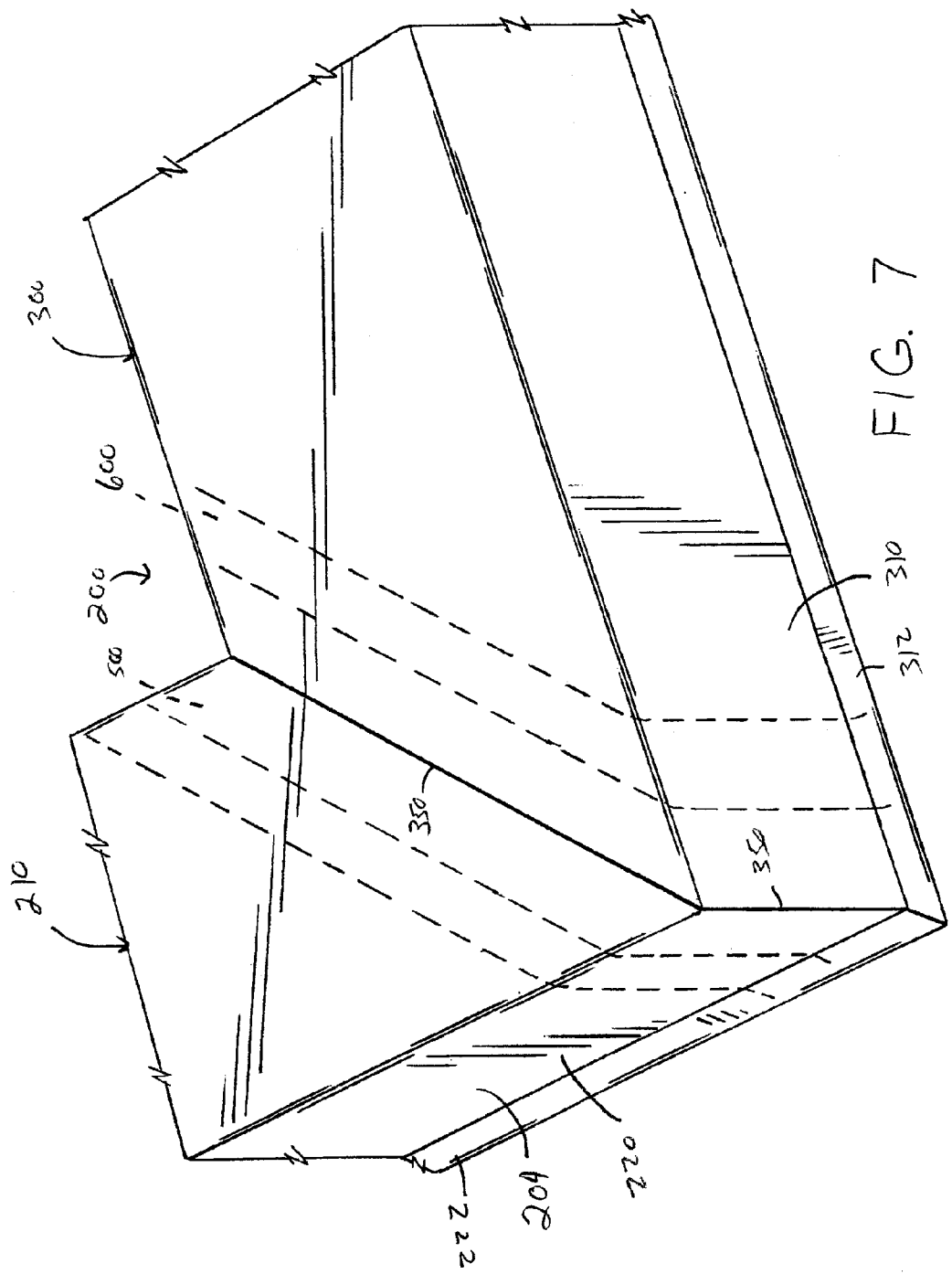
FIG. 7 is a perspective view of the exterior surface of the coping cap after the two pieces are connected together in accordance with the present invention.
Figure 8:
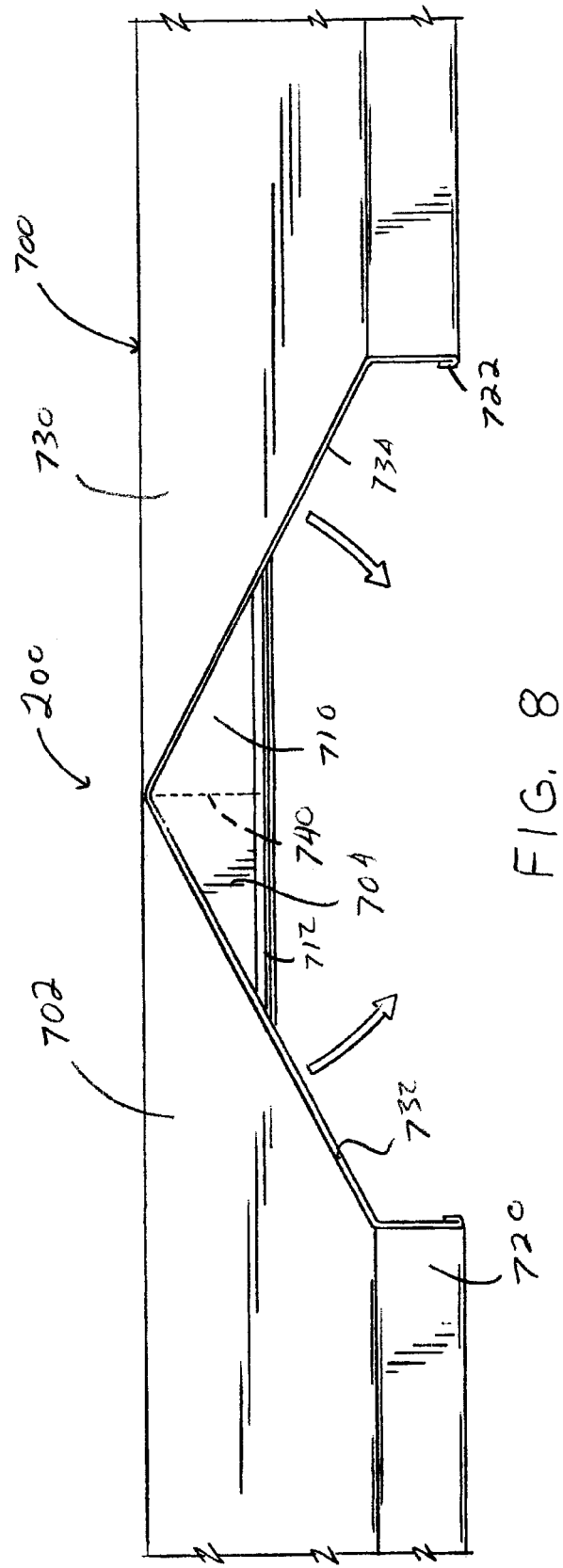
FIG. 8 is perspective view of one piece of material prior to be folded into the shape of a one-piece coping cap.

As illustrated in FIG. 7, the exterior surface of the coping cap 200 is absent a weld or solder bead on seam 350. In addition, the exterior surface of the coping cap is absent or substantially absent any adhesive, reinforcing material and/or protective layer 600. The exterior surface of the coping cap in accordance with the present invention does not require further treatment, thus discoloration issues regarding the exterior surface of the coping cap/transition are eliminated. Although the non-welded or solder abutting surfaces on the exterior surface of the coping cap/transition are not further treated, water, dirt, etc. cannot fully penetrate into the interior of the coping cap/transition due to the adhesive layer, the reinforcing layer and/or the protective layer 600 forming a water, dirt and/or air barrier layer at seam 350.

Figure 6:
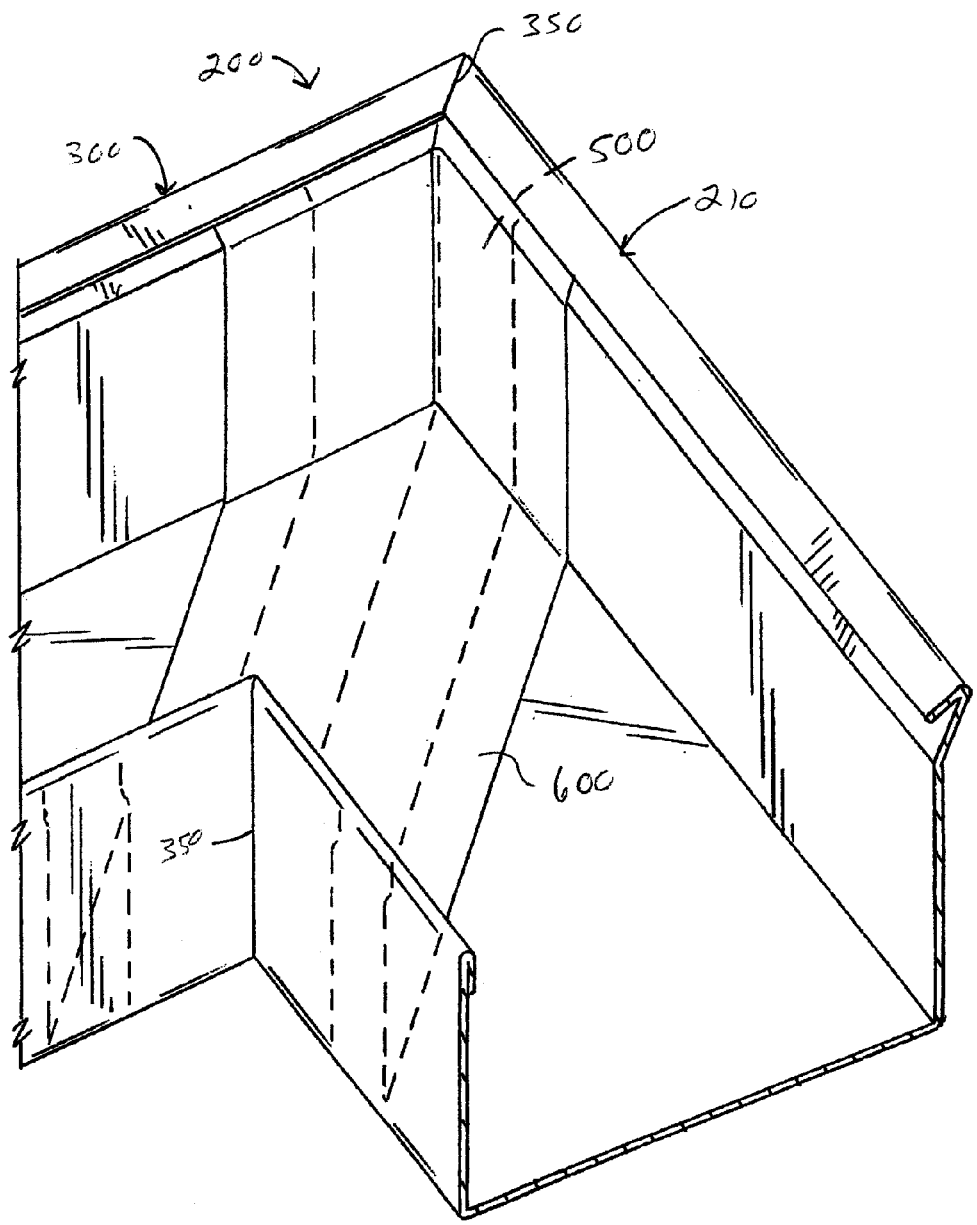
FIG. 6 is a perspective view of the interior surface of the two pieces of the coping cap of FIG. 5 wherein a protective layer is applied to the reinforcing material.

Referring now to FIG. 6, a protective layer 600 can be optionally used to partially or fully overlay and/or cover the reinforcing material and/or the adhesive layer on the interior surface of the coping cap. The protective layer can be in the form of a coating material and/or one or more strips of cover material. The size, composition, shape and/or thickness of the protective layer is non-limiting. The protective layer can be a metal material, a fabric material, a fiber layer, a composite material layer, a plastic material, a polymer coating, a painted layer, etc. As illustrated in FIG. 6, the protective layer is in the form of a piece of material such as a piece of tape (e.g., butyl tape, aluminum tape, etc.) that is positioned over the reinforcing material 500. The protective layer, when used, can a) provide additional structural strength to the coping cap, b) provide additional waterproofing or sealing to the seal of the coping cap, and c) result in improved aesthetics to the coping cap, and/or provide protection from damage, degradation and/or wear to the reinforcing material and/or adhesive layer. The width of the protective layer is generally at least 100% the width of the reinforcing material, and typically more than 100% the width of the reinforcing material. As illustrated in FIG. 6, the width of the protective layer is greater than the width of the reinforcing material. The width of the protective layer is generally at least about 70% the width of the adhesive layer, typically at least 100% the width of the adhesive layer, and more typically more than 100% the width of the adhesive layer. As illustrated in FIGS. 4-6, the width of the adhesive layer is equal to or less than the width of the reinforcing material, and the protective layer has a width that is greater than the width of the reinforcing material. The protective layer generally has a length and a width that is sufficient to cover at least about 75% of the reinforcing material, typically at least about 90% of the reinforcing material, more typically at least about 100% of the reinforcing material and, still more typically, more than 100% of the reinforcing material. The protective layer generally has a length and a width that is sufficient to cover at least 75% of the adhesive layer, typically at least about 90% of the adhesive layer, more typically at least about 100% of the adhesive layer, and still more typically, more than 100% of the adhesive layer. As illustrated in FIGS. 4-6, the length and width of the reinforcing material covers about 100% of the adhesive layer, and the length and width of the protective layer also covers about 100% of the reinforcing material.

Referring now to FIGS. 8-12, there is illustrated a coping cap 200 having an exterior surface 702 and an interior surface 704 that is formed from a single piece of material 700. The single piece of material includes a front flange 710, a rear flange 720 and a base section 730. The front flange can include a folded edge 712; however, this is not required. The rear edge can included a folded edge 722; however, this is not required. The profile of the coping cap is non-limiting. The single piece of material includes a cut-out portion that enables the single piece of material to be bent together about bendable edge 740 in the direction of the arrows. The cut-out portion includes first and second edges 732, 734. The material of the coping cap illustrated in FIGS. 8-12 can be the same or different materials described with respect to the coping cap illustrated in FIGS. 2-7.

Figure 9:
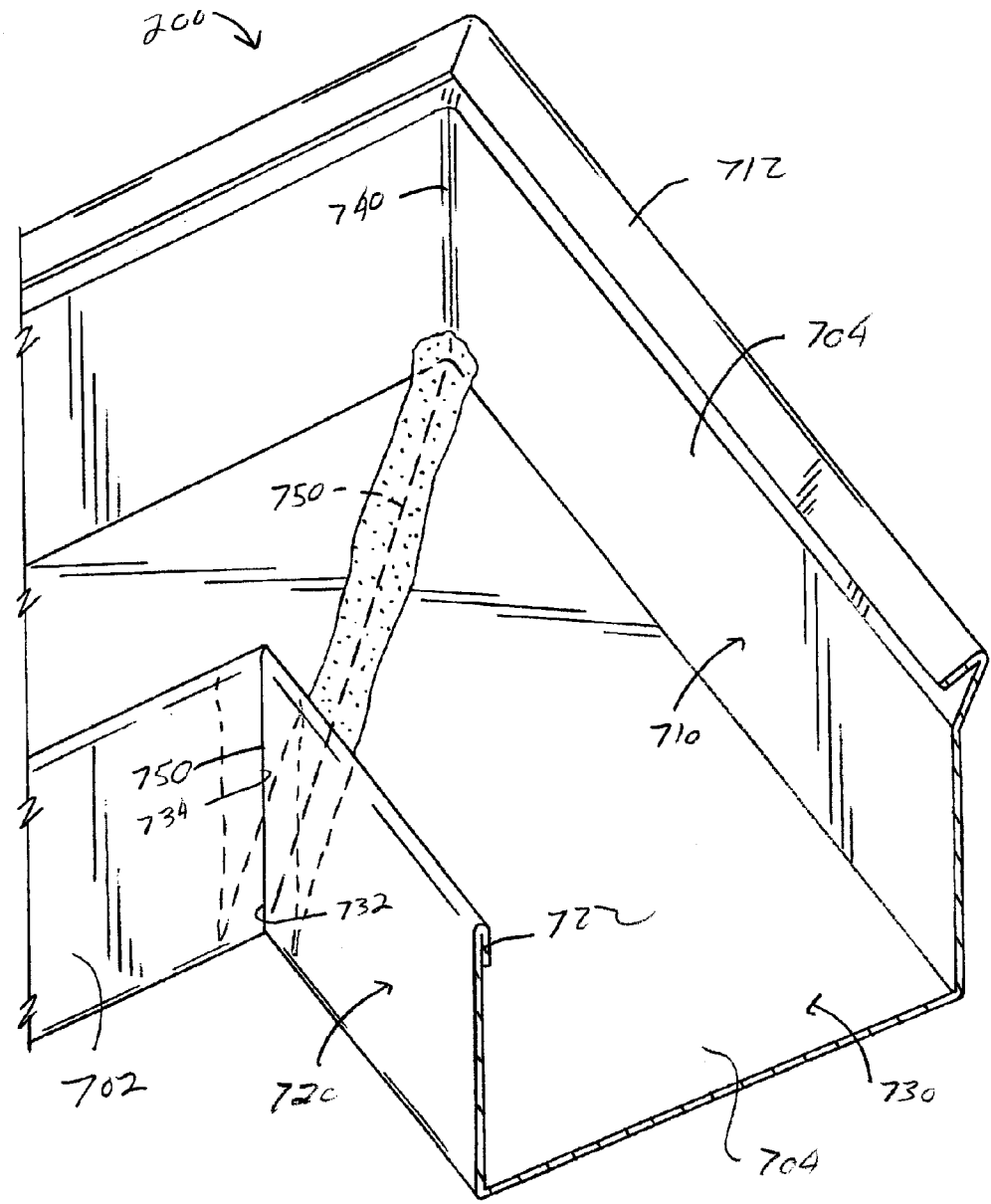
FIG. 9 is a perspective view of the interior surface of the one piece of material that has been folded into the shape of the coping cap and adhesive layer has been applied to the interior surface of the one piece of material.

Referring now to FIG. 9, the single piece of material has been bent together about bendable edge 740 such that edges 732, 734 abutted against one another or are positioned closely adjacent to one another. The single piece of material can be bent together by any number of process. For example, a jig or other type of device can be optionally used to fold the single piece of material. The abutting edges 732, 734 form a seam 750 in the coping cap 200. As illustrated in FIG. 9, an adhesive layer 400 is applied over the seam on the interior surface of the coping cap. The type of adhesive material and the manner in which the adhesive material is applied to the coping cap can be the same or different from the adhesive layer as described above with regard to FIG. 4. As illustrated in FIG. 9, a majority of the interior surface of the bendable edge 740 is not coated by the adhesive layer; however, this is not required.

Figure 10:
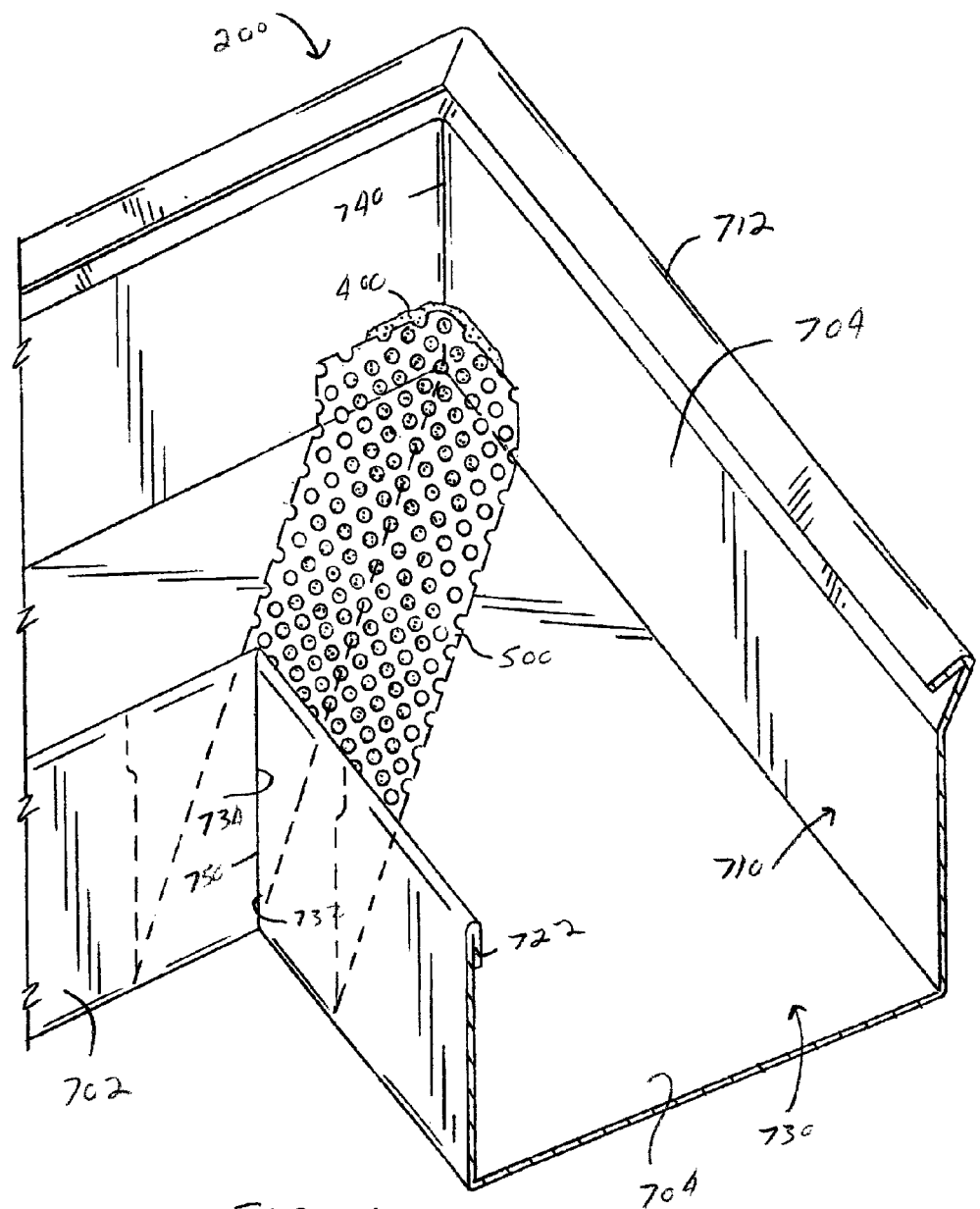
FIG. 10 is a perspective view of the interior surface of the one-piece coping cap of FIG. 9 wherein a reinforcing material is applied to the adhesive layer.

Referring now to FIG. 10, a reinforcing material 500 is applied over a portion or all of the adhesive layer. The reinforcing material is illustrated as being applied over and along the full length of the seam and mist, if not all, of the adhesive layer; however, this is not required. The reinforcing material is illustrated as overlapping the seam. The type of reinforcing material and the manner in which the reinforcing material is applied to the coping cap can be the same or different from the reinforcing layer as described above with regard to FIG. 5. As illustrated in FIG. 10, a majority of the interior surface of the bendable edge 740 is not covered by the reinforcing material; however, this is not required.

Figure 12:
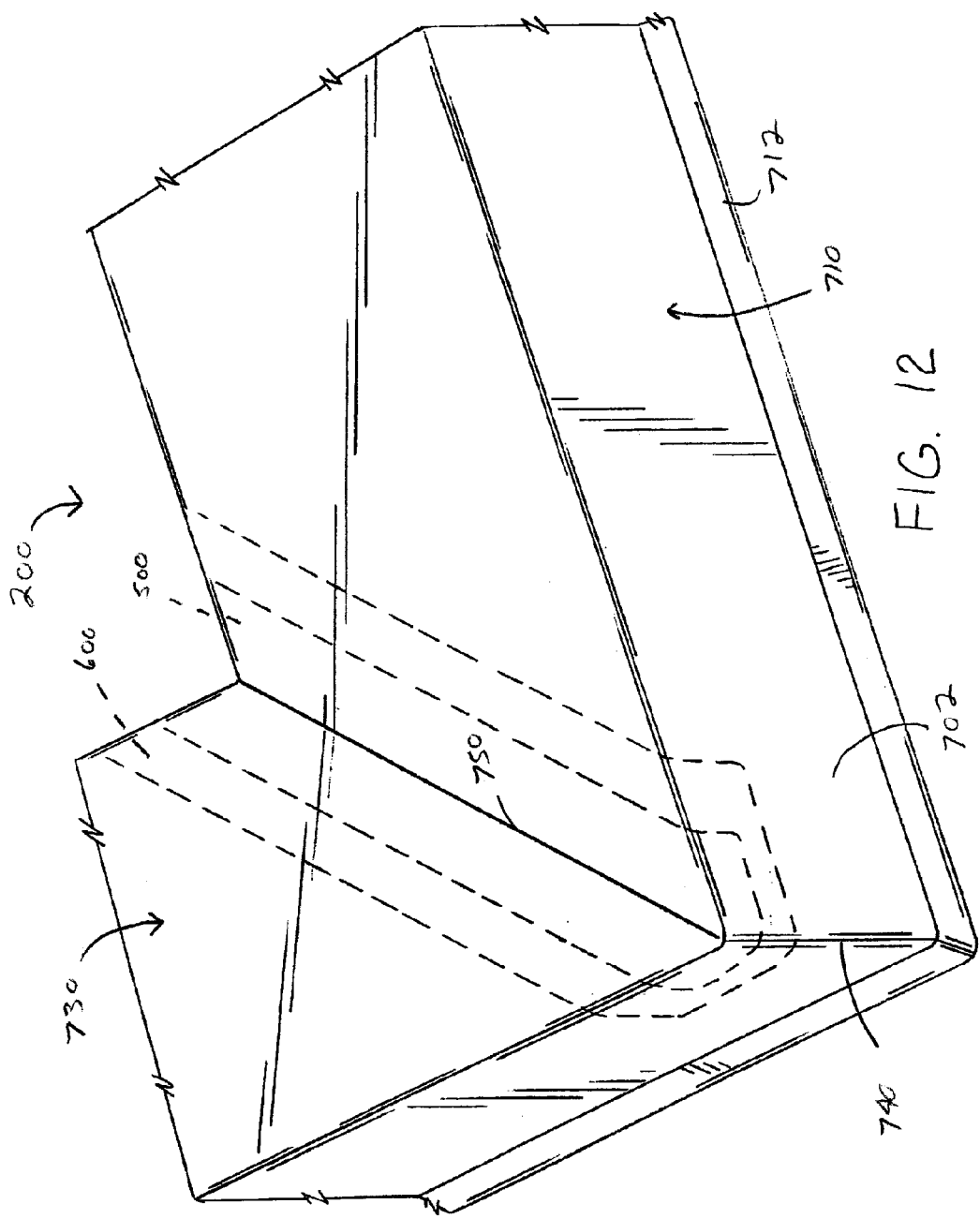

As illustrated in FIG. 12, the exterior surface of the coping cap 200 is absent a weld or solder bead on seam 750. In addition, the exterior surface of the coping cap is absent or substantially absent any adhesive, reinforcing material and/or protective layer 600. The exterior surface of the coping cap in accordance with the present invention does not require further treatment, thus discoloration issues regarding the exterior surface of the coping cap/transition are eliminated. Although the non-welded or solder abutting surfaces on the exterior surface of the coping cap/transition are not further treated, water, dirt, etc. cannot fully penetrate into the interior of the coping cap/transition due to the adhesive layer, the reinforcing layer and/or the protective layer 600 forming a water, dirt and/or air barrier layer at seam 750.

Figure 11:
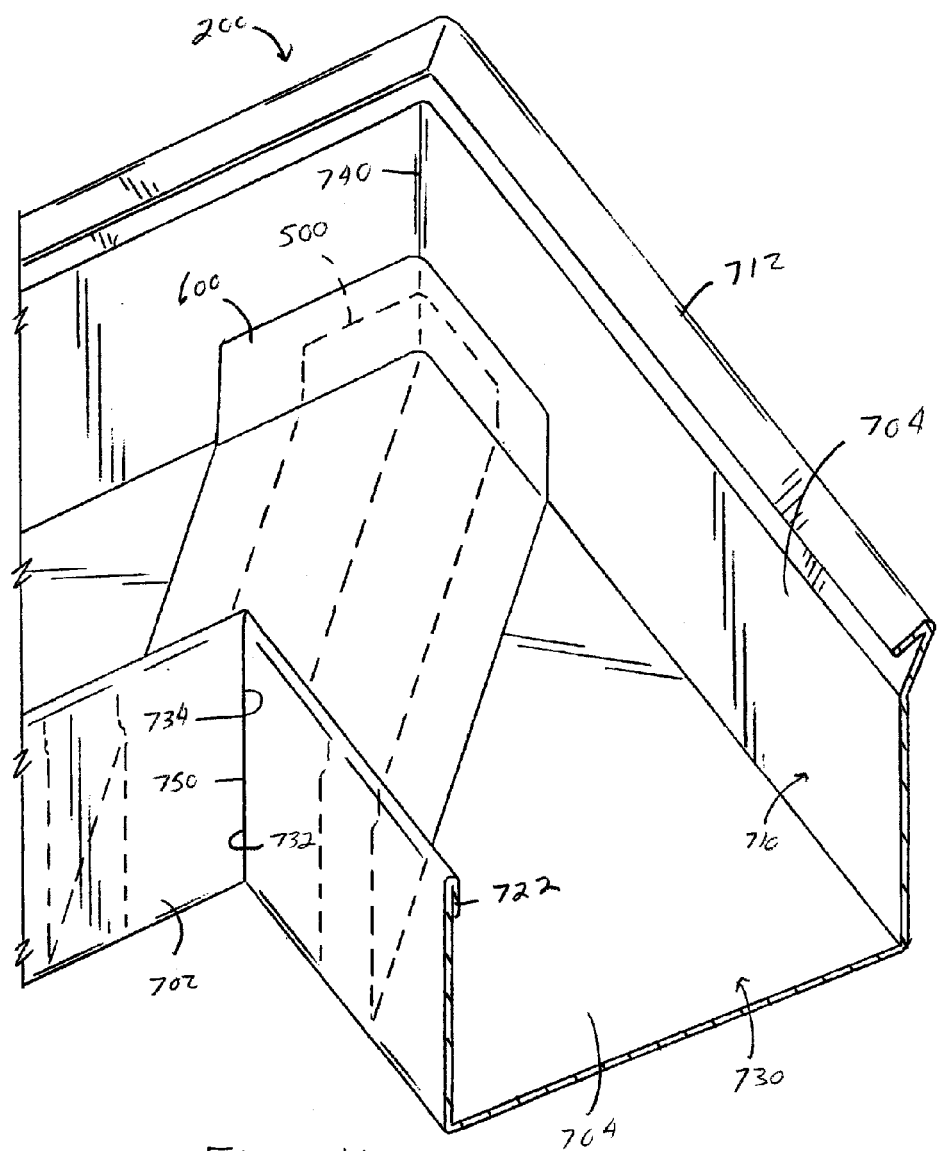
FIG. 11 is a perspective view of the interior surface of the one-piece coping cap of FIG. 10 wherein a protective layer is applied to the reinforcing material; and, FIG. 12 is a perspective view of the exterior surface of the coping cap after the folded one-piece material is connected together in accordance with the present invention.

Referring now to FIG. 11, a protective layer 600 can be optionally used to partially or fully overlay and/or cover the reinforcing material and/or the adhesive layer on the interior surface of the coping cap. The protective layer can be in the form of a coating material and/or one or more strips of cover material. The size, composition, shape and/or thickness of the protective layer is non-limiting. The type of protective layer and the manner in which the protective layer is applied to the coping cap can be the same or different from the protective layer as described above with regard to FIG. 6. As illustrated in FIG. 11, a majority of the interior surface of the bendable edge 740 is not covered by the protective layer; however, this is not required.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed is:

1. A coping cap or transition formed of one piece of material, said material including a base section and a rear flange, each of said base section and said rear flange having an exterior and interior surface, said base section including first and second edges that abut one another and are connected together to form a connected seam that is absent a welded or solder seam on said exterior surface of said base section, said rear flange including a bent section located adjacent to said connected seam, said bent section absent a seam, said interior surface of said base section including a layer of an adhesive positioned adjacent to said seam, on said seam, or combinations thereof and a layer of a reinforcing material that overlaps said seam and is secured to said layer of adhesive, said layer of said adhesive and said layer of said reinforcing material at least partially forming said connection of said seam, said reinforcing material applied to said adhesive such that said reinforcing material is positioned on said a top surface of said adhesive, partially embedded in said adhesive, or fully embedded in said adhesive, said reinforcing material includes one or more materials selected from the group consisting of a metal material, a fabric material, a fiber material, a composite material, or a plastic material, said adhesive and said reinforcing material forming a waterproof seam.

2. The coping cap or transition as defined in claim 1, including a protective layer positioned at least partially over said layer of adhesive, at least partially over said layer of reinforcing material, or combinations thereof, said protective layer including one or more materials selected from the group consisting of a metal material, a fabric material, a fiber layer, a plastic material, a polymer coating, and a painted layer.

3. The coping cap or transition as defined in claim 2, wherein said material is shaped in the form of a 90° corner, an angle other than 90°, a 3-way intersection, a 4-way or more intersection, a change in wall width, an end of a wall component, or a wall jamb.

4. The coping cap or transition as defined in claim 2, wherein said protective layer is positioned at least partially over said layer of adhesive and fully over said layer of reinforcing material, said protective layer formed of a different material from said reinforcing material.

5. The coping cap or transition as defined in claim 1, wherein said rear flange at said bent section forms a 90° corner.

6. The coping cap or transition as defined in claim 4, wherein said rear flange at said bent section forms a 90° corner.

7. The coping cap or transition as defined in claim 1, wherein said base section includes a front flange, said front flange and said rear flange spaced from one another, said front flange including first and second edges that abut one another and are connected together to form a connected front flange seam that is absent a welded or solder seam on an exterior surface of said front flange section, an interior surface of said front flange including a layer of an adhesive positioned adjacent to said front flange seam, on said front flange seam, or combinations thereof and a layer of a reinforcing material that overlaps said front flange seam and is secured to said layer of adhesive, said layer of said adhesive and said layer of said reinforcing material at least partially forming said connection of said front flange seam, said reinforcing material applied to said adhesive such that said reinforcing material is positioned on a top surface of said adhesive, partially embedded in said adhesive, or fully embedded in said adhesive, said reinforcing material includes one or more materials selected from the group consisting of a metal material, a fabric material, a fiber material, a composite material, or a plastic material, said adhesive and said reinforcing material forming a waterproof front flange seam, said front flange seam position adjacent to said seam in said base section.

8. The coping cap or transition as defined in claim 6, wherein said base section includes a front flange, said front flange and said rear flange spaced from one another, said front flange including first and second edges that abut one another and are connected together to form a connected front flange seam that is absent a welded or solder seam on an exterior surface of said front flange section, an interior surface of said front flange including a layer of an adhesive positioned adjacent to said front flange seam, on said front flange seam, or combinations thereof and a layer of a reinforcing material that overlaps said front flange seam and is secured to said layer of adhesive, said layer of said adhesive and said layer of said reinforcing material at least partially forming said connection of said front flange seam, said reinforcing material applied to said adhesive such that said reinforcing material is positioned on a top surface of said adhesive, partially embedded in said adhesive, or fully embedded in said adhesive, said reinforcing material includes one or more materials selected from the group consisting of a metal material, a fabric material, a fiber material, a composite material, or a plastic material, said adhesive and said reinforcing material forming a waterproof front flange seam, said front flange seam position adjacent to said seam in said base section.

9. The coping cap or transition as defined in claim 7, said layer of reinforcing material on said front flange seam is fully covered by a protective layer that includes one or more materials selected from the group consisting of a metal material, a fabric material, a fiber layer, a plastic material, a polymer coating, and a painted layer, said protective layer formed of a different material from said reinforcing material.

10. The coping cap or transition as defined in claim 8, said layer of reinforcing material on said front flange seam is fully covered by a protective layer that includes one or more materials selected from the group consisting of a metal material, a fabric material, a fiber layer, a plastic material, a polymer coating, and a painted layer, said protective layer formed of a different material from said reinforcing material.

11. The coping cap or transition as defined in claim 7, wherein said front flange has a different shape from said rear flange.

12. The coping cap or transition as defined in claim 10, wherein said front flange has a different shape from said rear flange.

13. The coping cap or transition as defined in claim 1, wherein said adhesive includes one or more adhesives selected from the group consisting of an epoxy adhesive and a urethane adhesive, said reinforcing material includes one or more materials selected from the group consisting of a strip of perforated sheet metal, a strip of glass fiber, a strip of aramid fiber, and a strip of carbon fiber.

14. The coping cap or transition as defined in claim 12, wherein said adhesive includes one or more adhesives selected from the group consisting of an epoxy adhesive and a urethane adhesive, said reinforcing material includes one or more materials selected from the group consisting of a strip of perforated sheet metal, a strip of glass fiber, a strip of aramid fiber, and a strip of carbon fiber.

15. A coping cap or transition formed of first and second pieces of material, each of said first and second pieces of material including a base section and a rear flange, each of said base section and said rear flange having an exterior and interior surface, said base section of said first piece of material including a first base edge, said rear flange of said first piece of material including a first rear flange edge, said base section of said second piece of material including a second base edge, said rear flange of said second piece of material including a second rear flange edge, said first base edge and said second base edge abutting one another to form a base seam, said first rear flange edge and said second rear flange edge abutting one another to form a rear flange seam, said base seam and said rear flange seam connected together by a connection that is absent a welded or solder seam on said exterior surface of said base section and rear flange of said first and second pieces of material, said interior surface of said base section and rear flange of said first and second pieces of material including a layer of an adhesive positioned adjacent to said base seam and said rear flange seam, on said base seam and said rear flange seam, or combinations thereof and a layer of a reinforcing material that overlaps said base seam and said rear flange seam and is secured to said layer of adhesive, said layer of said adhesive and said layer of said reinforcing material at least partially forming said connection of said base seam and said rear flange seam, said reinforcing material applied to said adhesive such that said reinforcing material is positioned on a top surface of said adhesive, partially embedded in said adhesive, or fully embedded in said adhesive, said reinforcing material includes one or more materials selected from the group consisting of a metal material, a fabric material, a fiber material, a composite material, or a plastic material, said adhesive and said reinforcing material forming a waterproof seam.

16. The coping cap or transition as defined in claim 15, including a protective layer positioned at least partially over said layer of adhesive and fully over said layer of reinforcing material; said protective layer formed of a different material from said reinforcing material.

17. The coping cap or transition as defined in claim 15, wherein said rear flange seam forms a 90° corner.

18. The coping cap or transition as defined in claim 16, wherein said rear flange seam forms a 90° corner.

19. The coping cap or transition as defined in claim 15, wherein said first and second pieces of material including a front flange on said base section, said front flange and said rear flange on said first and second pieces of material are spaced from one another, said front flange on said first piece of material including a first front flange edge, said front flange on said second piece of material including a second front flange edge, said first and second front flange edges abut one another and are connected together to form a connected front flange seam that is absent a welded or solder seam on an exterior surface of said front flanges of said first and second pieces of material, an interior surface of said front flanges of said first and second pieces of material including a layer of an adhesive positioned adjacent to said front flange seam, on said front flange seam, or combinations thereof and a layer of a reinforcing material that overlaps said front flange seam and is secured to said layer of adhesive, said layer of said adhesive and said layer of said reinforcing material at least partially forming said connection of said front flange seam, said reinforcing material applied to said adhesive such that said reinforcing material is positioned on a top surface of said adhesive, partially embedded in said adhesive, or fully embedded in said adhesive, said reinforcing material includes one or more materials selected from the group consisting of a metal material, a fabric material, a fiber material, a composite material, or a plastic material, said adhesive and said reinforcing material forming a waterproof front flange seam, said front flange seam position adjacent to said seam in said base section.

20. The coping cap or transition as defined in claim 18, wherein said first and second pieces of material including a front flange on said base section, said front flange and said rear flange on said first and second pieces of material are spaced from one another, said front flange on said first piece of material including a first front flange edge, said front flange on said second piece of material including a second front flange edge, said first and second front flange edges abut one another and are connected together to form a connected front flange seam that is absent a welded or solder seam on an exterior surface of said front flanges of said first and second pieces of material, an interior surface of said front flanges of said first and second pieces of material including a layer of an adhesive positioned adjacent to said front flange seam, on said front flange seam, or combinations thereof and a layer of a reinforcing material that overlaps said front flange seam and is secured to said layer of adhesive, said layer of said adhesive and said layer of said reinforcing material at least partially forming said connection of said front flange seam, said reinforcing material applied to said adhesive such that said reinforcing material is positioned on a top surface of said adhesive, partially embedded in said adhesive, or fully embedded in said adhesive, said reinforcing material includes one or more materials selected from the group consisting of a metal material, a fabric material, a fiber material, a composite material, or a plastic material, said adhesive and said reinforcing material forming a waterproof front flange seam, said front flange seam position adjacent to said seam in said base section.

21. The coping cap or transition as defined in claim 19, said layer of reinforcing material on said front flange seam is fully covered by a protective layer that includes one or more materials selected from the group consisting of a metal material, a fabric material, a fiber layer, a plastic material, a polymer coating, and a painted layer, said protective layer formed of a different material from said reinforcing material.

22. The coping cap or transition as defined in claim 20, said layer of reinforcing material on said front flange seam is fully covered by a protective layer that includes one or more materials selected from the group consisting of a metal material, a fabric material, a fiber layer, a plastic material, a polymer coating, and a painted layer, said protective layer formed of a different material from said reinforcing material.

23. The coping cap or transition as defined in claim 19, wherein said front flange has a different shape from said rear flange.

24. The coping cap or transition as defined in claim 22, wherein said front flange has a different shape from said rear flange.

25. The coping cap or transition as defined in claim 15, wherein said adhesive includes one or more adhesives selected from the group consisting of an epoxy adhesive and a urethane adhesive, said reinforcing material includes one or more materials selected from the group consisting of a strip of perforated sheet metal, a strip of glass fiber, a strip of aramid fiber, and a strip of carbon fiber.

26. The coping cap or transition as defined in claim 24, wherein said adhesive includes one or more adhesives selected from the group consisting of an epoxy adhesive and a urethane adhesive, said reinforcing material includes one or more materials selected from the group consisting of a strip of perforated sheet metal, a strip of glass fiber, a strip of aramid fiber, and a strip of carbon fiber.

* * * * *